(12) United States Patent
Vartanian et al.

(10) Patent No.: US 9,684,079 B2
(45) Date of Patent: *Jun. 20, 2017

(54) DETERMINING CONTEXT OF A MOBILE COMPUTER

(71) Applicant: Samsung Electronics Co., Ltd., Suwon-si, Gyeonggi-do (KR)

(72) Inventors: Harry Vartanian, Philadelphia, PA (US); Jaron Jurikson-Rhodes, Philadelphia, PA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/864,284

(22) Filed: Sep. 24, 2015

(65) Prior Publication Data

US 2016/0012486 A1 Jan. 14, 2016

Related U.S. Application Data

(63) Continuation of application No. 14/628,946, filed on Feb. 23, 2015, now Pat. No. 9,176,230, which is a
(Continued)

(51) Int. Cl.
*G06Q 30/02* (2012.01)
*G01S 19/49* (2010.01)
(Continued)

(52) U.S. Cl.
CPC ............ *G01S 19/13* (2013.01); *G01B 21/00* (2013.01); *G01S 5/0294* (2013.01); *G01S 15/06* (2013.01);
(Continued)

(58) Field of Classification Search
CPC .......... G01S 15/08; G01S 19/49; G01S 17/06; G01S 19/13; G01S 19/06; G01S 15/06; G01S 5/0294; G01S 19/17; G01S 15/89; G01S 19/11; G01S 2015/465; G01S 2013/468; G01S 2013/466; G01B 21/00;
(Continued)

(56) References Cited

U.S. PATENT DOCUMENTS 5,256,908 A 10/1993 Averbuch et al.
5,377,106 A 12/1994 Drunk et al.
(Continued)

FOREIGN PATENT DOCUMENTS

DE 10226329 A1 12/2003
EP 1887313 A1 2/2008
(Continued)

OTHER PUBLICATIONS

Master Table of Contents from Specification of the Bluetooth System, Version 4.0. Published Jun. 30, 2010. For full specification (https://www.bluetooth.org/en-us/specification/adopted-specifications).
(Continued)

*Primary Examiner* — Daniel Pihulic
(74) *Attorney, Agent, or Firm* — Jefferson IP Law, LLP

(57) ABSTRACT

A mobile computer may determine it is located in a vehicle or a conveyance based on a measured distance, satellite related positioning information, and a touch input.

12 Claims, 5 Drawing Sheets

Related U.S. Application Data continuation of application No. 14/460,591, filed on Aug. 15, 2014, now Pat. No. 9,116,230, which is a continuation of application No. 13/776,643, filed on Feb. 25, 2013, now Pat. No. 8,842,496, which is a continuation of application No. 13/412,317, filed on Mar. 5, 2012, now Pat. No. 8,395,968, which is a continuation of application No. 12/900,951, filed on Oct. 8, 2010, now Pat. No. 8,174,931.

(51) Int. Cl.

| | | |
|---|---|---|
| *G01S 5/02* | (2010.01) | |
| *G01S 19/13* | (2010.01) | |
| *G01S 15/08* | (2006.01) | |
| *G01S 15/89* | (2006.01) | |
| *H04W 4/04* | (2009.01) | |
| *G01S 19/17* | (2010.01) | |
| *G01B 21/00* | (2006.01) | |
| *G01S 15/06* | (2006.01) | |
| *G01S 17/06* | (2006.01) | |
| G01S 19/06 | (2010.01) | |
| G01S 19/11 | (2010.01) | |
| G01S 15/46 | (2006.01) | |
| G01S 13/46 | (2006.01) | |

(52) U.S. Cl.
CPC .............. *G01S 15/08* (2013.01); *G01S 15/89* (2013.01); *G01S 17/06* (2013.01); *G01S 19/17* (2013.01); *G01S 19/49* (2013.01); *G06Q 30/0266* (2013.01); *G06Q 30/0267* (2013.01); *H04W 4/04* (2013.01); *G01S 19/06* (2013.01); *G01S 19/11* (2013.01); *G01S 2013/466* (2013.01); *G01S 2013/468* (2013.01); *G01S 2015/465* (2013.01); *Y10S 367/907* (2013.01)

(58) Field of Classification Search
CPC . G06Q 30/0266; G06Q 30/0267; H04W 4/04; Y10S 367/907
See application file for complete search history.

(56) References Cited

U.S. PATENT DOCUMENTS

| | | |
|---|---|---|
| 5,598,209 A | 1/1997 | Cortjens et al. |
| 5,948,043 A | 9/1999 | Mathis |
| 6,006,021 A | 12/1999 | Tognazzini |
| 6,171,246 B1 | 1/2001 | Averkiou et al. |
| 6,388,612 B1 | 5/2002 | Neher |
| 6,445,308 B1 | 9/2002 | Koike |
| 6,657,544 B2 | 12/2003 | Barry et al. |
| 6,687,650 B2 | 2/2004 | Hatanaka et al. |
| 6,750,813 B2 | 6/2004 | Vargas-Hurlston et al. |
| 6,772,213 B2 | 8/2004 | Glorikian |
| 6,795,786 B2 | 9/2004 | LaMarca et al. |
| 6,816,437 B1 | 11/2004 | Teller et al. |
| 6,898,518 B2 | 5/2005 | Padmanabhan |
| 6,959,282 B2 | 10/2005 | Kakihara et al. |
| 6,961,594 B2 | 11/2005 | Rankin |
| 6,985,758 B2 | 1/2006 | Rankin |
| 7,012,521 B2 | 3/2006 | Fardin et al. |
| 7,019,644 B2 | 3/2006 | Barrie |
| 7,027,311 B2 | 4/2006 | Vanderelli et al. |
| 7,050,835 B2 | 5/2006 | Hack et al. |
| 7,082,359 B2 | 7/2006 | Breed |
| 7,298,289 B1 | 11/2007 | Hoffberg |
| 7,336,226 B2 | 2/2008 | Jung et al. |
| 7,343,268 B2 | 3/2008 | Kishikawa |
| 7,352,652 B2 | 4/2008 | Holm et al. |
| 7,359,714 B2 | 4/2008 | Parupudi et al. |
| 7,392,131 B2 | 6/2008 | Haseloff |
| 7,397,357 B2 | 7/2008 | Krumm et al. |
| 7,406,116 B2 | 7/2008 | Agrawala et al. |
| 7,439,907 B2 | 10/2008 | Wang et al. |
| 7,456,596 B2 | 11/2008 | Goodall et al. |
| 7,463,188 B1 | 12/2008 | McBurney |
| 7,507,948 B2 | 3/2009 | Park et al. |
| 7,513,829 B2 | 4/2009 | Hayashida et al. |
| 7,555,370 B2 | 6/2009 | Breed et al. |
| 7,589,672 B2 | 9/2009 | Malinovskiy et al. |
| 7,603,128 B1 | 10/2009 | Jones et al. |
| 7,642,957 B2 | 1/2010 | Lennen et al. |
| 7,688,678 B2 | 3/2010 | Larsen et al. |
| 7,711,687 B2 | 5/2010 | Rappaport et al. |
| 7,724,610 B2 | 5/2010 | Supino et al. |
| 7,738,678 B2 | 6/2010 | Breed et al. |
| 7,746,226 B2 | 6/2010 | Cohen et al. |
| 7,764,574 B2 | 7/2010 | Lee |
| 7,796,471 B2 | 9/2010 | Guigne et al. |
| 7,809,071 B2 | 10/2010 | Kajihara |
| 7,818,017 B2 | 10/2010 | Alizadeh-Shabdiz et al. |
| 7,834,801 B2 | 11/2010 | Waite et al. |
| 7,864,633 B2 | 1/2011 | Holm et al. |
| 7,916,661 B2 | 3/2011 | Alizadeh-Shabdiz et al. |
| 7,925,384 B2 | 4/2011 | Huizenga et al. |
| 7,996,150 B2 | 8/2011 | Nishida |
| 8,032,151 B2 | 10/2011 | Paulson et al. |
| 8,050,690 B2 | 11/2011 | Neeraj |
| 8,063,823 B2 | 11/2011 | Ruelke et al. |
| 8,098,186 B2 | 1/2012 | Beeri |
| 8,115,620 B2 | 2/2012 | Breed |
| 8,154,440 B2 | 4/2012 | Lewis |
| 8,174,931 B2 | 5/2012 | Vartanian et al. |
| 8,175,619 B2 | 5/2012 | Filizola et al. |
| 8,180,591 B2 | 5/2012 | Yuen et al. |
| 8,284,100 B2 | 10/2012 | Vartanian et al. |
| 8,289,352 B2 | 10/2012 | Vartanian et al. |
| 8,295,375 B2 | 10/2012 | Stadelmeier et al. |
| 8,315,619 B1 | 11/2012 | Nunally et al. |
| 8,319,687 B2 | 11/2012 | Kahle |
| 8,323,081 B2 | 12/2012 | Koizumi et al. |
| 8,327,396 B2 | 12/2012 | Ramaswamy et al. |
| 8,350,758 B1 | 1/2013 | Parvizi et al. |
| 8,362,949 B2 | 1/2013 | Yang et al. |
| 8,395,968 B2 | 3/2013 | Vartanian et al. |
| 8,400,292 B2 | 3/2013 | Kummetz |
| 8,406,783 B2 | 3/2013 | Eitan et al. |
| 8,467,804 B2 | 6/2013 | Lindquist |
| 8,478,297 B2 | 7/2013 | Morgan et al. |
| 8,489,111 B2 | 7/2013 | Chawla |
| 8,494,762 B2 | 7/2013 | Patel et al. |
| 8,570,993 B2 | 10/2013 | Austin et al. |
| 8,606,260 B2 | 12/2013 | Chatterjee |
| 8,612,756 B1 | 12/2013 | Meier et al. |
| 8,615,254 B2 | 12/2013 | Jamtgaard et al. |
| 8,626,443 B2 | 1/2014 | Robertson et al. |
| 8,633,817 B2 | 1/2014 | Khorashadi et al. |
| 8,659,429 B1 | 2/2014 | Wagner et al. |
| 8,665,245 B2 | 3/2014 | Pryor |
| 8,686,951 B2 | 4/2014 | Vartanian et al. |
| 8,707,458 B2 | 4/2014 | Malaney |
| 8,725,120 B2 | 5/2014 | Glorikian |
| 8,731,333 B2 | 5/2014 | Sieracki |
| 8,737,933 B2 | 5/2014 | Carlton et al. |
| 8,737,961 B2 | 5/2014 | Ma et al. |
| 8,743,244 B2 | 6/2014 | Vartanian et al. |
| 8,842,496 B2 | 9/2014 | Vartanian et al. |
| 8,866,766 B2 | 10/2014 | Vartanian et al. |
| 9,110,159 B2 | 8/2015 | Vartanian et al. |
| 9,116,230 B2 | 8/2015 | Vartanian et al. |
| 9,176,230 B2 | 11/2015 | Vartanian et al. |
| 9,182,494 B2 | 11/2015 | Vartanian et al. |
| 9,244,173 B1* | 1/2016 | Vartanian ................ G01S 15/08 |
| 2004/0132465 A1 | 7/2004 | Mattila et al. |
| 2004/0139110 A1 | 7/2004 | LaMarca et al. |
| 2006/0095234 A1 | 5/2006 | Brignone et al. |
| 2006/0096392 A1* | 5/2006 | Inkster .................... B32B 5/18 |
| | | 73/862.041 |
| 2006/0221769 A1 | 10/2006 | Van Loenen et al. |
| 2007/0085838 A1 | 4/2007 | Ricks et al. |
| 2007/0118248 A1 | 5/2007 | Lee et al. |

(56) References Cited

U.S. PATENT DOCUMENTS

| | | |
|---|---|---|
| 2007/0127422 A1 | 6/2007 | Belcea |
| 2007/0139391 A1 | 6/2007 | Bischoff |
| 2007/0247422 A1 | 10/2007 | Vertegaal et al. |
| 2008/0005068 A1 | 1/2008 | Dumais et al. |
| 2008/0064333 A1 | 3/2008 | Hymes |
| 2008/0066123 A1 | 3/2008 | Igoe et al. |
| 2008/0075323 A1 | 3/2008 | Hartwig |
| 2008/0120029 A1 | 5/2008 | Zelek et al. |
| 2008/0151692 A1 | 6/2008 | Dijk et al. |
| 2008/0242418 A1 | 10/2008 | Theimer et al. |
| 2008/0259732 A1 | 10/2008 | Booij et al. |
| 2009/0072985 A1 | 3/2009 | Patel et al. |
| 2009/0156232 A1 | 6/2009 | Benco et al. |
| 2009/0187374 A1 | 7/2009 | Baxter et al. |
| 2009/0190441 A1 | 7/2009 | Zhao et al. |
| 2009/0198371 A1 | 8/2009 | Emanuel et al. |
| 2009/0237328 A1 | 9/2009 | Gyorfi et al. |
| 2009/0251996 A1 | 10/2009 | Dijk |
| 2009/0295639 A1 | 12/2009 | Zhao et al. |
| 2009/0312036 A1 | 12/2009 | Alizadeh-Shabdiz |
| 2009/0318182 A1 | 12/2009 | Nagato et al. |
| 2010/0008270 A1 | 1/2010 | Ahn et al. |
| 2010/0029335 A1 | 2/2010 | Vartanian |
| 2010/0066384 A1 | 3/2010 | Rogovin et al. |
| 2010/0090899 A1 | 4/2010 | Zhao et al. |
| 2010/0109842 A1 | 5/2010 | Patel et al. |
| 2010/0109849 A1 | 5/2010 | Wang et al. |
| 2010/0135178 A1 | 6/2010 | Aggarwal et al. |
| 2010/0203972 A1 | 8/2010 | Lee |
| 2010/0225756 A1 | 9/2010 | Miyata |
| 2010/0228653 A1 | 9/2010 | Yamaji et al. |
| 2010/0245129 A1 | 9/2010 | Stratton |
| 2010/0245585 A1 | 9/2010 | Fisher et al. |
| 2010/0277338 A1 | 11/2010 | Laroche |
| 2010/0295733 A1 | 11/2010 | Luo et al. |
| 2010/0295812 A1 | 11/2010 | Burns et al. |
| 2010/0302033 A1 | 12/2010 | Devenyi et al. |
| 2010/0317366 A1 | 12/2010 | Shen et al. |
| 2010/0317371 A1 | 12/2010 | Westerinen et al. |
| 2010/0318701 A1 | 12/2010 | Srinivasan et al. |
| 2010/0321275 A1 | 12/2010 | Hinckley et al. |
| 2010/0322077 A1 | 12/2010 | Cho et al. |
| 2011/0010089 A1 | 1/2011 | Sambongi |
| 2011/0018687 A1 | 1/2011 | Holm |
| 2011/0029277 A1 | 2/2011 | Chowdhary et al. |
| 2011/0045840 A1 | 2/2011 | Alizadeh-Shabdiz et al. |
| 2011/0056286 A1 | 3/2011 | Jansen |
| 2011/0080318 A1 | 4/2011 | Alizadeh-Shabdiz et al. |
| 2011/0194230 A1 | 8/2011 | Hart et al. |
| 2011/0285592 A1 | 11/2011 | Green et al. |
| 2011/0288684 A1 | 11/2011 | Farlow et al. |
| 2011/0310703 A1 | 12/2011 | Steimel |
| 2012/0087212 A1 | 4/2012 | Vartanian et al. |
| 2012/0100870 A1 | 4/2012 | Prost et al. |
| 2012/0169530 A1 | 7/2012 | Padmanabhan et al. |
| 2012/0239333 A1 | 9/2012 | Keene et al. |
| 2012/0245995 A1 | 9/2012 | Chawla |
| 2012/0293613 A1 | 11/2012 | Powers et al. |
| 2013/0158941 A1 | 6/2013 | Yang et al. |
| 2013/0326643 A1 | 12/2013 | Pai et al. |
| 2014/0269193 A1 | 9/2014 | Junkar et al. |
| 2014/0368382 A1 | 12/2014 | Vartanian et al. |
| 2016/0012486 A1* | 1/2016 | Vartanian .............. G01S 15/08 705/14.63 |

FOREIGN PATENT DOCUMENTS

| | | |
|---|---|---|
| WO | 2004036246 A1 | 4/2004 |
| WO | 2005040847 A2 | 5/2005 |
| WO | 2007012899 A1 | 2/2007 |
| WO | 2008059279 A1 | 5/2008 |
| WO | 2008135794 A1 | 11/2008 |
| WO | 2009024784 A2 | 2/2009 |
| WO | 2009029980 A1 | 3/2009 |
| WO | 2010084308 A1 | 7/2010 |
| WO | 2012037577 A2 | 3/2012 |

OTHER PUBLICATIONS

Bluetooth Low Energy (LE) Specification from Specification of the Bluetooth System, Version 4.0., Published Jun. 30, 2010.
Non-Final Office Action, U.S. Appl. No. 14/460,591, dated Jun. 12, 2015.
Notice of Allowance, U.S. Appl. No. 14/460,591, dated Jul. 13, 2015.
Non-Final Office Action, U.S. Appl. No. 14/611,222, dated Jun. 17, 2015.
Notice of Allowance, U.S. Appl. No. 14/611,222, dated Sep. 25, 2015.
Non-Final Office Action, U.S. Appl. No. 14/619,600, dated Jun. 22, 2015.
Notice of Allowance, U.S. Appl. No. 14/619,600, dated Jul. 10, 2015.
Non-Final Office Action, U.S. Appl. No. 14/628,946, dated Jun. 17, 2015.
Notice of Allowance, U.S. Appl. No. 14/628,946, dated Sep. 23, 2015.
Patel, Dhaval. "Use of Accelerometers and Gyroscopes in Position Sensing," date unknown.
Notice of Allowance, U.S. Appl. No. 14/854,723, dated Nov. 6, 2015.
"Hands-on with the Structure Sensor iPad-mounted 3D Scanner (CES 2014)," www.youtube.com/watch? v=9JOhPHDeRkU. Published Jan. 9, 2014.
"Google I/O 2013—The Next Frontier: Indoor Maps," published May 16, 2013 at www.youtube.com/watch? v=oLOUXNEcAJk.
Non-Final Rejection, U.S. Appl. No. 13/776,643, dated Feb. 21, 2014.
Notice of Allowance, U.S. Appl. No. 13/776,643, dated Jul. 22, 2013.
Notice of Allowance, U.S. Appl. No. 13/776,643, dated Jun. 23, 2014.
"3rd Generation Partnership Project; Technical Specification Group Radio Access Network; Stage 2 functional specification of User Equipment (UE) positioning in UTRAN (Release 9)," 3GPP TS 25.305 V9.0.0 (Dec. 2009).
"Aero Scout Announces World's First Wi-Fi Asset Tracking Solution with Embedded Ultrasound Capabilities," Apr. 1, 2009, Redwood City, California.
"Location Awareness Programming Guide," Apple Inc., May 20, 2010.
"Low-power Indoor Positioning System that is Robust to Signal Loss and Noise," Sep. 28, 2010.
"Obtaining User Location I Android Developers," Google, Apr. 1, 2011.
"Ping)))™ Ultrasonic Range Finder (#28015)," Parallax, Inc., Jun. 2005.
"SafeLink™ Geolocation," 2010.
"Ultrasonic Transducers Technical Notes," Olympus NDT, 2006, pp. 40-48.
"Zonith Indoor Positioning Module Bluetooth positioning and LoneWorker protection," White Paper Version 2.1a, 2010.
Araklian, H., "Indoor & Outdoor location sensing," 2007.
Bahl et al., "Radar: An In-Building RF-based User Location and Tracking System," Microsoft Research, 2000.
Borriello et al., "WALRUS: Wireless Acoustic Location with Room Level Resolution using Ultrasound," MobiSys '05: The Third International Conference on Mobile Systems, Applications, and Services, 2005, pp. 191-203.
Carroll et al., "An Analysis of Power Consumption in a Smartphone," Proceedings of the 2010 USENIX Annual Technical Conference, Jun. 22, 2010, Boston, MA, USA.
Challamel et al., "Performance Assessment of Indoor Location Technologies," IEEE, 2008, pp. 624-632.

(56) References Cited

OTHER PUBLICATIONS

Chintalapudi et al., "Indoor Localization Without the Pain," MobiCom'10, Sep. 20-24,2010, Chicago, Illinois, USA.
Constandache et al., "EnLoc: Energy-Efficient Localization for Mobile Phones," IEEE Infocom 2009 (Mini), Apr. 2009, Rio de Janeiro, Brazil.
Curran et al., "An Evaluation of Indoor Location Determination Technologies," Investigations in Location Awareness, Date Uncertain, pp. 101-162.
Dedes et al., "Indoor GPS Positioning Challenges and Opportunities," 2005.
Dijk et al., "A 3-D Indoor Positioning Method using a Single Compact Base Station," Proceedings of the Second IEEE Annual Conference on Pervasive Computing and Communications (PERCOM'04), 2004.
Dijk, E., "Indoor Ultrasonic Position Estimation Using a Single Base Station," Eindhoven : Technische Universiteit Eindhoven, 2004.
Dillow, C., "Mobile Indoor Positioning is Coming, But Incompatible Standards Stand in the Way," Popular Science, Sep. 22, 2010.
Fukuju et al., "Dolphin: An Autonomous Indoor Positioning System in Ubiquitous Computing Environment," May 15-16, 2003.
Greenemeier, L., "A Positioning System That Goes Where GPS Can't," Scientific American, Jan. 23, 2008.
Hirschler, B., "New satellite navigation system may save fire fighters," Thomson Reuters, Dec. 12, 2007.
Holm, S., "Hybrid Ultrasound-RFID Indoor Positioning: Combining the Best of Both Worlds," 2009 IEEE International Conference on RFID, 2009, pp. 155-162.
Kalliola, K., "Bringing Navigation Indoors," The Way We Live Next 2008, Sep. 23, 2008, Nokia.
Kim et al., "Large Scale Indoor Location System based on Wireless Sensor Networks for Ubiquitous Computing," Aug. 27, 2010.
Kohler et al., "TrackSense: Infrastructure Free Precise Indoor Positioning using Projected Patterns," 2007.
Magedanz et al., "GRIPS Generic Radio based Indoor Positioning System," Proceedings of the 2nd Workshop on Positioning, Navigation and Communication (WPNC'05) & 1st Ultra-Wideband Expert Talk (UET'05), 2005, pp. 133-140.
Manu, O.E., "A Study of Indoor Localization Techniques," 2009.
Mautz, R.,"Combination of Indoor and Outdoor Positioning," 1st International Conference on Machine Control & Guidance, 2008.
Mezentsev, O.A., "Self-Contained Sensor Aided Kinematic HSGPS Positioning Algorithm," ION GNSS, Positioning, Location and Navigation (PLAN) Research Group, Department of Geomatics Engineering, University of Calgary, Sep. 21-24, 2004, pp. 1-11, Long Beach, CA.
Nixon, N., "Top 5 Ultrasonic Range Finders," Yahoo!, Aug. 19, 2008.
Notice of Allowance from U.S. Appl. No. 12/900,951, Jan. 26, 2012.
O'Connor, M.C., "Testing Ultrasound to Track, Monitor Patients," RFID Journal, Mar. 15, 2006.
Patel et al., "PowerLine Positioning: A Practical Sub-Room-Level Indoor Location System for Domestic Use," ubicomp 2006, LNCS 4206, 2006, pp. 441-458.
Priyantha et al., "The Cricket Location-Support System," 6th ACM International Conference on Mobile Computing and Networking (ACM MOBICOM), Aug. 2000, Boston, MA.
Randell et al., "Low Cost Indoor Positioning System," Department of Computer Science, University of Bristol, UK, 2001.
Romero et al., "Building Maps Using Indoor Mobile Robots with Ultrasonic and Laser Range Sensors," 2002, pp. 10-18 http://www.ejournal.unam.mx/cys/edi_esp/CYSE02.pdf.
Ross, S., "Radar-Microsoft Research," 2011.
Ruppel et al., "Indooria—A Platform for Proactive Indoor Location based Services," 2008.
Sameshima et al., "Experiences with Cricket/Ultrasound Technology for 3-Dimensional Locationing within an Indoor Smart Environment," Feb. 2009, Carnegie Mellon University-Silicon Valley Campus.
Various Authors, XDA-developers forum on GPS on Froyo, Sep. 27, 2010.
Vittorini et al., "Optimizing Indoor GPS Performance," GPS World, Nov. 1, 2003.
Wiebflecker, T., "A distributed indoor navigation system leaving the trails," 2009.
Willaredt, J., "WiFi and Cell-ID based positioning-Protocols, Standards and Solutions," Jan. 26, 2011.
Zheng et al., "HIPS: A Calibration-less Hybrid Indoor Positioning System Using Heterogeneous Sensors," 2009.
Non-final Office Action from U.S. Appl. No. 13/412,317, Jul. 24, 2012.
Notice of Allowance from U.S. Appl. No. 13/463,538, Jul. 18, 2012.
Structure website, www. structure.io, last visited Feb. 7, 2014.

\* cited by examiner

DETERMINING CONTEXT OF A MOBILE COMPUTER

CROSS REFERENCE TO RELATED APPLICATIONS

This application is a continuation of U.S. patent application Ser. No. 14/628,946 filed Feb. 23, 2015, which is a continuation of U.S. patent application Ser. No. 14/460,591 filed Aug. 15, 2014, which issued as U.S. Pat. No. 9,116,230 on Aug. 25, 2015, which is a continuation of U.S. patent application Ser. No. 13/776,643 filed Feb. 25, 2013, which issued as U.S. Pat. No. 8,842,496 on Sep. 23, 2014, which is a continuation of U.S. patent application Ser. No. 13/412,317 filed Mar. 5, 2012, which issued as U.S. Pat. No. 8,395,968 on Mar. 12, 2013, which is a continuation of U.S. patent application Ser. No. 12/900,951 filed Oct. 8, 2010, which issued as U.S. Pat. No. 8,174,931 on May 8, 2012, the contents of which are all hereby incorporated by reference herein as if fully set forth.

This application is related to U.S. patent application Ser. No. 13/463,538 filed May 3, 2012, which issued as U.S. Pat. No. 8,284,100 on Oct. 9, 2012, and to U.S. patent application Ser. No. 14/611,222 filed Jan. 31, 2015. This application is also related to U.S. patent application Ser. No. 14/619,600 filed Feb. 11, 2015, which issued as U.S. Pat. No. 9,110,159 on Jun. 4, 2016, and U.S. patent application Ser. No. 14/854,723 filed Sep. 15, 2015.

FIELD OF INVENTION

This application relates to indoor location or position determination. In particular, it relates to providing indoor location or position determination of object devices using building information and/or powerlines.

BACKGROUND

Location determination systems, such as the global positioning system (GPS), have provided the ability to find and track location of object devices enabling new applications like location based services (LBS). Although fairly accurate outdoors, many location determination systems cannot detect when an object device is indoors, accurately track objects indoors, or determine if an object device is in a vehicle or conveyance. It is desirable to detect or track object devices indoors for applications such as safety, e-business, gaming, directions, or the like.

Solutions have been proposed for locating object devices indoors involving beacons, transponders, and/or powerlines. However, these systems require the installation of a plurality of devices or indoor base stations in order to work and require complicated additional hardware in the object device. It desirable to locate an object device indoors without the need for much added hardware or complexity.

SUMMARY

An apparatus and method for providing indoor detection, location, position, or track determination of object devices using building information and/or powerlines. An object device may determine the dimensions of the interior of a building and compare it to known information about the dimensions of the building to determine that it's indoors and/or also determine its exact location or position in the building. An object device may also determine dimensions in an enclosure in order to identify if it is in an automobile, aircraft, or any other conveyance.

BRIEF DESCRIPTION OF THE DRAWINGS

A more detailed understanding may be had from the following description, given by way of example in conjunction with the accompanying drawings wherein.

DETAILED DESCRIPTION

Figure 1:
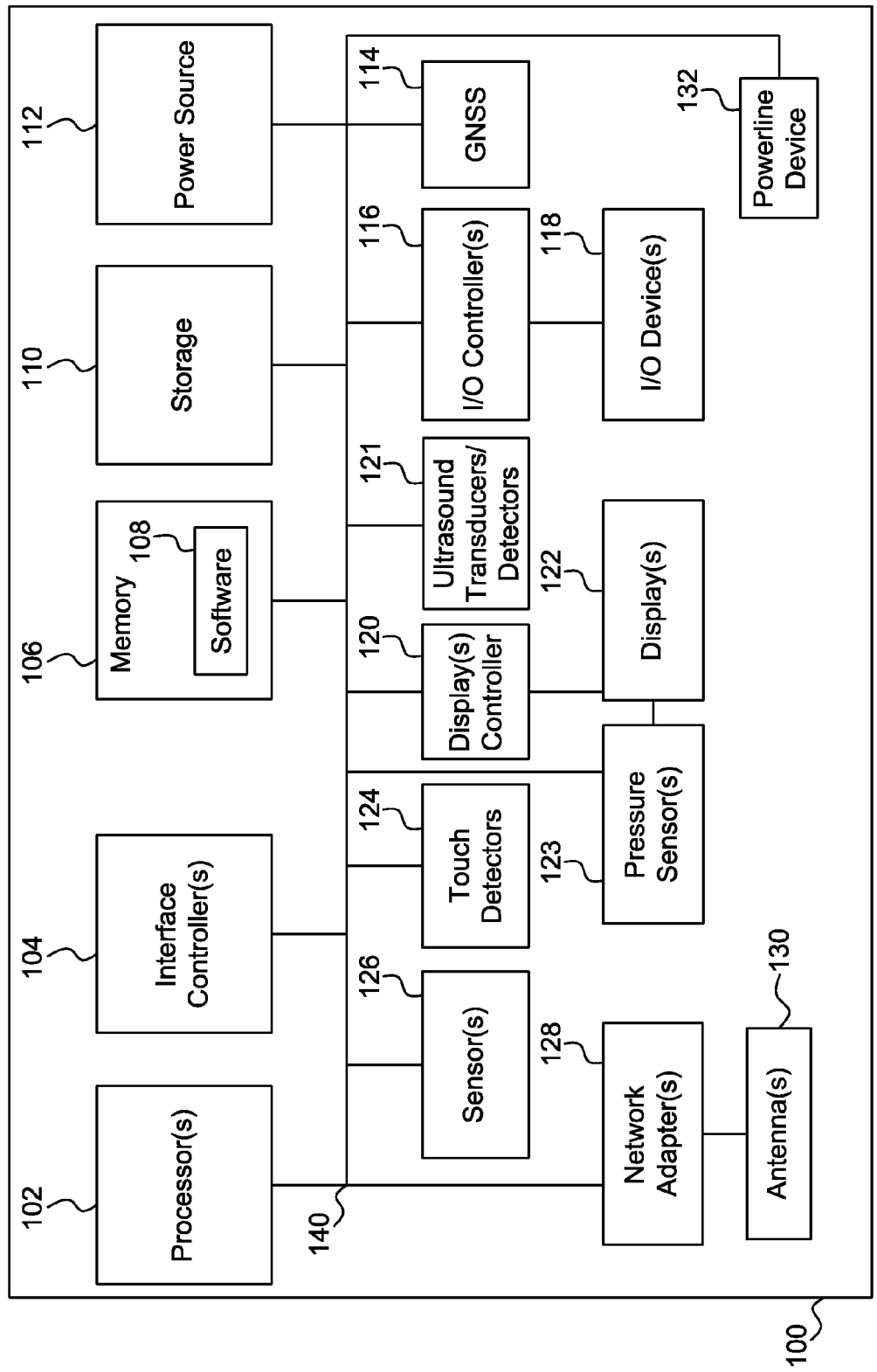
FIG. 1 is a diagram of an object device that may detected, located, positioned, or tracked indoors or in a conveyance.

The present invention will be described with reference to the drawing figures wherein like numerals represent like elements throughout. For the processes described below the steps recited may be performed out of sequence and sub-steps not explicitly described or shown may be performed. In addition, "coupled" or "operatively coupled" may mean that objects are linked between zero or more intermediate objects. Also, any combination of the disclosed features/elements may be used in one or more embodiments. When using referring to "A or B", it may include A, B, or A and B, which may be extended similarly to longer lists.

In the embodiments provided below, indoor location or position within a building may be determined using signals that may be received from endpoints, such as an outlet, by an object device. In addition or combination, an object device may emit signals, such as ultrasound, to determine the dimensions of a room in a building to subsequently determine indoor location or position.

FIG. 1 is a diagram of an object device 100 that may be detected, located, positioned, or tracked indoors or in a conveyance. Object device may be configured as a wireless subscriber unit, user equipment (UE), mobile station, smartphone, pager, mobile computer, cellular telephone, telephone, personal digital assistant (PDA), computing device, surface computer, tablet computer, monitor, general display, versatile device, appliance, automobile computer system, vehicle computer system, television device, a laptop, a netbook, a tablet computer, a personal computer, a wireless sensor, an Internet pad, a digital music player, a peripheral, virtual reality glasses, a media player, a video game device, or the like for mobile or fixed applications. Any of devices, controllers, displays, components, etc., in object device 100 may be combined, made integral, or separated, as desired.

Object device 100 comprises computer bus 140 that couples at least one or more processors 102, one or more interface controllers 104, memory 106 having software 108, storage device 110, power source 112, and/or one or more displays controller 120. One or more processors 102 may be a general purpose processor, a special purpose processor, a conventional processor, a digital signal processor (DSP), a plurality of microprocessors, one or more microprocessors in association with a DSP core, a controller, a microcontroller, single core processor, a multi-core processor, Application Specific Integrated Circuits (ASICs), Field Programmable Gate Array (FPGAs) circuits, any other type of integrated circuit (IC), or the like.

One or more display devices 122 may be configured as a liquid crystal display (LCD), light emitting diode (LED) display, field emission display (FED), organic light emitting diode (OLED) display, flexible OLED display, or the like. The one or more display devices 122 may be configured, manufactured, produced, or assembled based on the descriptions provided in U.S. Patent Publication Nos. 2007-247422, 2007-139391, 2007-085838, or 2006-096392 or U.S. Pat. No. 7,050,835 or WO Publication 2007-012899 all herein incorporated by reference as if fully set forth.

In the case of a flexible display device, the one or more electronic display devices 122 may be configured and assembled using organic light emitting diodes (OLED), liquid crystal displays using flexible substrate technology, flexible transistors, field emission displays (FED) using flexible substrate technology, or the like. One or more display devices 122 may be configured as a touch or multitouch screen display using resistive, capacitive, surface-acoustic wave (SAW) capacitive, infrared, strain gauge, optical imaging, dispersive signal technology, acoustic pulse recognition, frustrated total internal reflection or magnetostrictive technology, as understood by one of ordinary skill in the art.

Coupled to computer bus 140 are one or more input/output (I/O) controller 116, I/O devices 118, Global Navigation Satellite Systems (GNSS) device 114, one or more network adapters 128, and/or one or more antennas 130. Examples of I/O devices include a speaker, microphone, keyboard, keypad, touchpad, display, touchscreen, wireless gesture device, a digital camera, a digital video recorder, a vibration device, or the like.

Object device 100 may have one or more motion, proximity, light, optical, chemical, environmental, moisture, acoustic, heat, temperature, radio frequency identification (RFID), biometric, face recognition, image, photo, or voice recognition sensors 126 and touch detectors 124 for detecting any touch inputs, including multi-touch inputs, for one or more display devices 122. Sensors 126 may also be an accelerometer, an e-compass, gyroscope, a 3D gyroscope, or the like. One or more interface controllers 104 may communicate with touch detectors 124 and I/O controller 116 for determining user inputs to object device 100. Coupled to one or more display devices 122 may be pressure sensors 123 for detecting presses on one or more display devices 122.

Still referring to object device 100, storage device 110 may be any disk based or solid state memory device for storing data. Power source 112 may be a plug-in, battery, fuel cells, solar panels for receiving and storing solar energy, or a device for receiving and storing wireless power as described in U.S. Pat. No. 7,027,311 herein incorporated by reference as if fully set forth.

One or more network adapters 128 may be configured as a Frequency Division Multiple Access (FDMA), single carrier FDMA (SC-FDMA), Time Division Multiple Access (TDMA), Code Division Multiple Access (CDMA), Orthogonal Frequency-Division Multiplexing (OFDM), Orthogonal Frequency-Division Multiple Access (OFDMA), Global System for Mobile (GSM) communications, Interim Standard 95 (IS-95), IS-856, Enhanced Data rates for GSM Evolution (EDGE), General Packet Radio Service (GPRS), Universal Mobile Telecommunications System (UMTS), cdma2000, wideband CDMA (W-CDMA), High-Speed Downlink Packet Access (HSDPA), High-Speed Uplink Packet Access (HSUPA), High-Speed Packet Access (HSPA), Evolved HSPA (HSPA+), long term evolution (LTE), LTE Advanced (LTE-A), 802.11x, Wi-Fi, Zigbee, UltrWideBand (UWB), 802.16x, 802.15, Wi-Max, mobile Wi-Max, Bluetooth, radio frequency identification, Infrared Data Association (IrDA), or any other wireless or wired transceiver for modulating and demodulating signals via one or more antennas 130.

Object device 100 may include ultrasound transducers and detectors/sensors 121 that emits or transmits one or more ultrasound signals and detects ultrasound signal reflections of emitted or transmitted ultrasound signals. Ultrasound transducers and detectors 121 may also detect any ultrasound signals emitted or transmitted by other ultrasound transducers, such as in another object device. Ultrasound transducers and detectors 121 may comprise a single transducer and detector or a plurality of transducers and detectors, such as in an array. Ultrasound transducers and detectors 121 may be an add-on, attachment, accessory, or peripheral coupled to object device 100 using a wired or wireless communication link, such as universal serial bus (USB), Bluetooth, or Wi-Fi.

Figure 2:
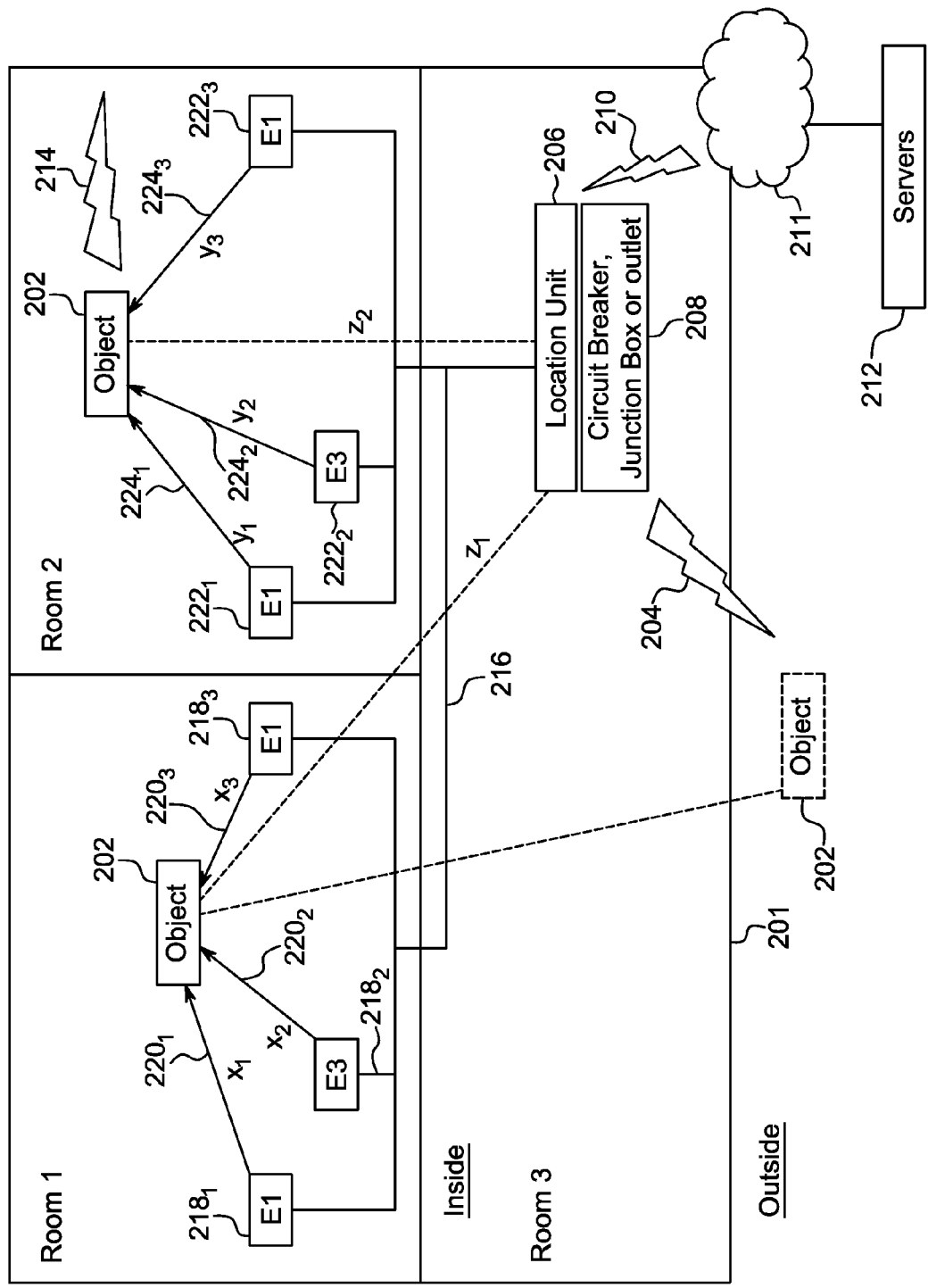
FIG. 2 is a diagram of detecting, locating, positioning, or tracking an object device indoors using powerlines.

FIG. 2 is a diagram of detecting, locating, positioning, or tracking an object device indoors using powerlines. In powerline location services object determination, object device 202 may be configured with at least some of the circuitry described in FIG. 1 and may initially be outside or exterior to building 201. Via local or Internet communication link 204, object device 202 may receive building information from location unit 206. Location unit 206 is a device coupled to a circuit breaker box, junction box, or a common electrical outlet 208 and/or powerlines, electrical wire, or electric cable 216 in room 3. Alternatively, object device 202 may already have building information stored in storage device 110 for building 201.

Location unit 206 may receive over communication link 210 and network 211, information about building 201 from at least one or more servers 212. At least one or more servers 212 may be collocated or distributed over multiple locations in a computer network, such as the Internet. Receiving information about building 201 may be done during an initialization process where the geographic location of circuit breaker, junction box, or outlet 208 is provided to location unit 206, such as by programming by a user or over the air (OTA) programming by at least one or more servers 212. Alternatively, location unit 206 may have a GNSS, GPS, or a cell tower based location device to determine its initial position. Network 211 may include both wired and wireless networks.

Information about building 201 may include the number floors, the number of rooms, architectural plans, architectural schematics, 3D room dimensions, 3D (e.g. width, length, height) estimated room dimensions, 2D (e.g., width and length) room dimensions, 2D estimated room dimensions, room volumes, space volumes, room areas, space areas, simple room layouts (e.g., width and length), room geometry, floorplans, building models, site plans, site surveys, or the like. Building 201 may be an abode, apartment, house, mall, warehouse, commercial building, office, cabin, condo, condominium, domicile, dormitory, dwelling, hospital, house, residence, shelter, enclosure, or the like.

Alternatively, location unit 206 may determine the dimensions and characteristics of building 201 using an initialization or fingerprinting process where a training signal, special signal, or beacon is communicated over powerlines electrical wire, or electric cable 216 to determine the distance to endpoints $218_1$, $218_2$, $218_3$, $222_1$, $222_2$, or $222_3$. The training signal, special signal, or beacon may be a signal having a frequency and/or power level that will cause strong reflections off of endpoints $218_1$, $218_2$, $218_3$, $222_1$, $222_2$, or $222_3$. The distance may be determined by measuring the time it takes for a reflection of the training signal, special signal, or beacon to travel to each endpoint and back to location unit 206. When calculating the distance, path loss models for powerlines, copper, wires, connectors, junction boxes, switches, or outlets may be taken under consideration by location unit 206. The various distances may be used to build a rough model of building 201.

Object device 202 moves to room 1 and receives at least signals $220_1$, $220_2$, or $220_3$ from endpoints $218_1$, $218_2$, or $218_3$ transmitted by location unit 206, respectively. Endpoints $218_1$, $218_2$, or $218_3$ may be special or ordinary electrical outlets, switches, or fixtures capable of transmitting signals. For instance, an ordinary electrical outlet can transmit signals since it has electrical contacts exposed to air that may act as antennas to transmit signals in a wide frequency range. Signals $220_1$, $220_2$, or $220_3$ may be a radio frequency signal, a wireless ultrasound signal, or wireless ultrasonic signal that is configured to avoid noise and interference from other devices. This may be achieved by using spread spectrum.

Signals $220_1$, $220_2$, or $220_3$ may be modulated using amplitude shift keying (ASK), frequency shift keying (FSK), binary phase shift keying (BPSK), quadrature shift keying (QPSK), quadrature amplitude modulation (QAM), code division multiple access (CDMA), orthogonal frequency division modulation (OFDM), or the like. As an example, so that object device 202 does not need special transceiver circuitry, radio frequency signal may be unused bit space in an 802.11x, Wi-Fi, or any other standard based message.

Object device 202 determines it is indoors by receiving any one of signals $220_1$, $220_2$, or $220_3$. Once in room 1, object device 202 determines its location or position within room 1 by receiving signals $220_1$, $220_2$, or $220_3$ to calculate or estimate distances $x_1$, $x_2$, or $x_3$ within a few inches or feet. So that object device 202 has awareness of what room it is in within building 201, object device 202 determines its separation from location unit 206 from the signal strength of signals 2201, 2202, or 2203. The specific room within building 201 may be determined by comparing calculated or estimated distance $z_1$ to building layout or model information stored in storage device 110.

Moreover, object device 202 may determine its location or position in room 1 by any combination of time of arrival (TOA), triangulation, trilateration, multilateration, time difference of arrival (TDOA), Enhanced Observed Time Difference (E-OTD), or time of flight calculations or estimations using at least one of signals $220_1$, $220_2$, or $220_3$. The location or position may be GNSS or GPS like longitude or latitude values.

Once object device 202 determines its location or position within room 1, it can be tracked and map its movement on object device 202, remotely on a server, the Internet, or another device on the Internet. When moving into room 2, object device 202 receives signals $224_1$, $224_2$, or $224_3$ from endpoints $222_1$, $222_2$, or $222_3$ transmitted by location unit 206 to calculate or estimate distances $y_1$, $y_2$, or $y_3$ within a few inches or feet. In order to differentiate rooms, signals $220_1$, $220_2$, or $220_3$ may be different from signals $224_1$, $224_2$, or $224_3$. So that object device 202 has awareness of what room it is in within building 201, object device 202 determines its separation from location unit 206 from the signal strength of signals $224_1$, $224_2$, or $224_3$. The specific room is determined by comparing calculated or estimated distance $z_2$ to building layout or model information stored in storage device 110.

If object device 202 is unable to determine its room location within building 201, it may compare distances $z_2$ to $z_1$ for assistance information. For instance, in this example since $z_2 < z_1$ object device 202 may be able to determine its location by having two data points to compare to building layout or model information.

Object device 202 may also use recent outdoor location information, such as by Global Navigation Satellite Systems (GNSS), GALILEO, or GPS, such as to estimate what side of the building it is located to further narrow its location search within building 201 and reduce the possible location positions when comparing it to building layout or model information. The last known altitude reading of object device 202 may also assist it in determining what floor in building 201 it is on. Object device's 202 speed and bearing from outdoor location services may also be provided as assistance data for tracking indoors. Moreover, if an exact room location cannot be determined, object device 202 may calculate, provide, and/or display on one or more display devices 122 a probability that it's in a certain room.

Moreover, object device 202 may be able to detect its speed and direction of motion within room 1 by determining the rate of change of values $x_1$, $x_2$, or $x_3$. This may help in determining or expecting the next location or position of object device 202.

Object device 202 may also use a specialized GNSS or GPS high sensitive receiver configured to receive outdoor GNSS or GPS signals indoors as assistance information for determining its room location or location within a room in building 201. Moreover, building 201 may have a GNSS or GPS repeater that repeats received outdoor GNSS or GPS signals indoors. This may also be used by object device 202 as assistance information to determine its room location or location within a room in building 201.

Another example of assistance data is using a camera on object device 202 to identify objects or characteristics unique to room 1 or 2. Identified objects or characteristics unique to room 1 or 2 are compared to stored objects previously identified for room 1 or 2 in a database in storage device 110 or at least one or more servers 212. Object device 202 may wirelessly communicate with at least one or more servers 212 over communication link 214 to access the database. Assistance information is especially helpful when in a building where location unit 206 is centrally located to all rooms.

Another example of assistance data may be having a RFID reader in object device 202 to read radio frequency identification (RFID) tags near elevator doors on every floor of building 201 to identify the floor object device 202 gets on or off. An elevator may also have a beacon or transmitter that identifies each floor by transmitting a signal that can be detected by object device 202. In addition, a floor identification device may also use Wi-Fi, Bluetooth, a femtocell, or a picocell on the elevator to communicate floor information to object device 202.

Another example of assistance data is using a laser transceiver or other light sensitive devices to determine the distance or range to any walls or ceiling. This may be used sparingly or for initial calibration in order to not bother the user or other people in building 201.

An accelerometer, gyroscope, or e-compass in object device 202 may be used for determining orientation before performing any measurements to determine position within room 1. Orientation may be used to determine if object device 202 is upright or upside down and the direction the user is facing within room 1. Orientation may be useful in position or location calculations.

Once an initial position and room location is determined for object device 202, an accelerometer, gyroscope, or e-compass in object device 202 may also be used to estimate inertia or motion in order to estimate its next location. This data may be used when moving from room 1 to 2 as assistance data. Inertial data may also be used for faster calculations. For instance, if object device 202 is moving in a certain direction $d_1$ and $d'_1$ may have values moving in opposite directions, i.e. one increases while the other decreases. Using direction detection, object device 202 will know which value should be increasing or decreasing.

Figure 3:
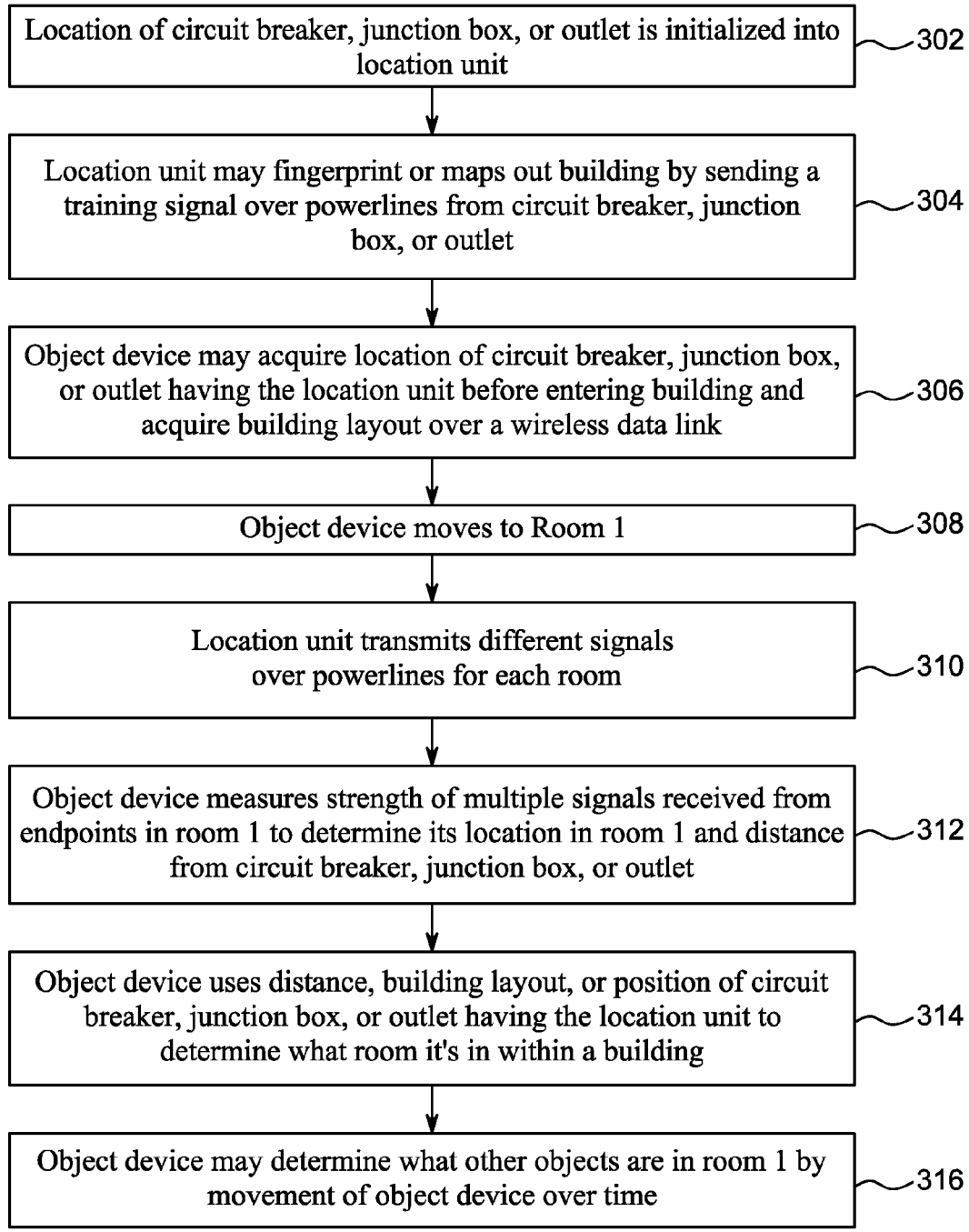
FIG. 3 is a process for detecting, locating, positioning, or tracking an object device indoors using powerlines.

FIG. 3 is a process for detecting, locating, positioning, or tracking an object device indoors using powerlines. Location of circuit breaker, junction box, or outlet is initialized into a location unit (302). The location unit may fingerprint or maps out a building by sending a training signal over powerlines from circuit breaker, junction box, or outlet (304). Object device may acquire location of a circuit breaker, junction box, or outlet having the location unit before entering the building and acquire building layout over a wireless data link (306). Object device moves to room 1 (308).

Location unit transmits different signals over powerlines for each room (310). Object device measures strength of multiple signals received from endpoints, such as electrical outlets, in room 1 to determine its location in room 1 and the distance from circuit breaker, junction box, or electrical outlet having the location unit (312). Object device uses distance, building layout, or position of the circuit breaker, junction box, or outlet having the location unit to determine what room it is in within a building (314). Object device may determine what other objects are in room 1 by movement of the object device over time (316). The determined objects in the room may be tracked and stored in a database in the object device or server on the Internet.

Figure 4:
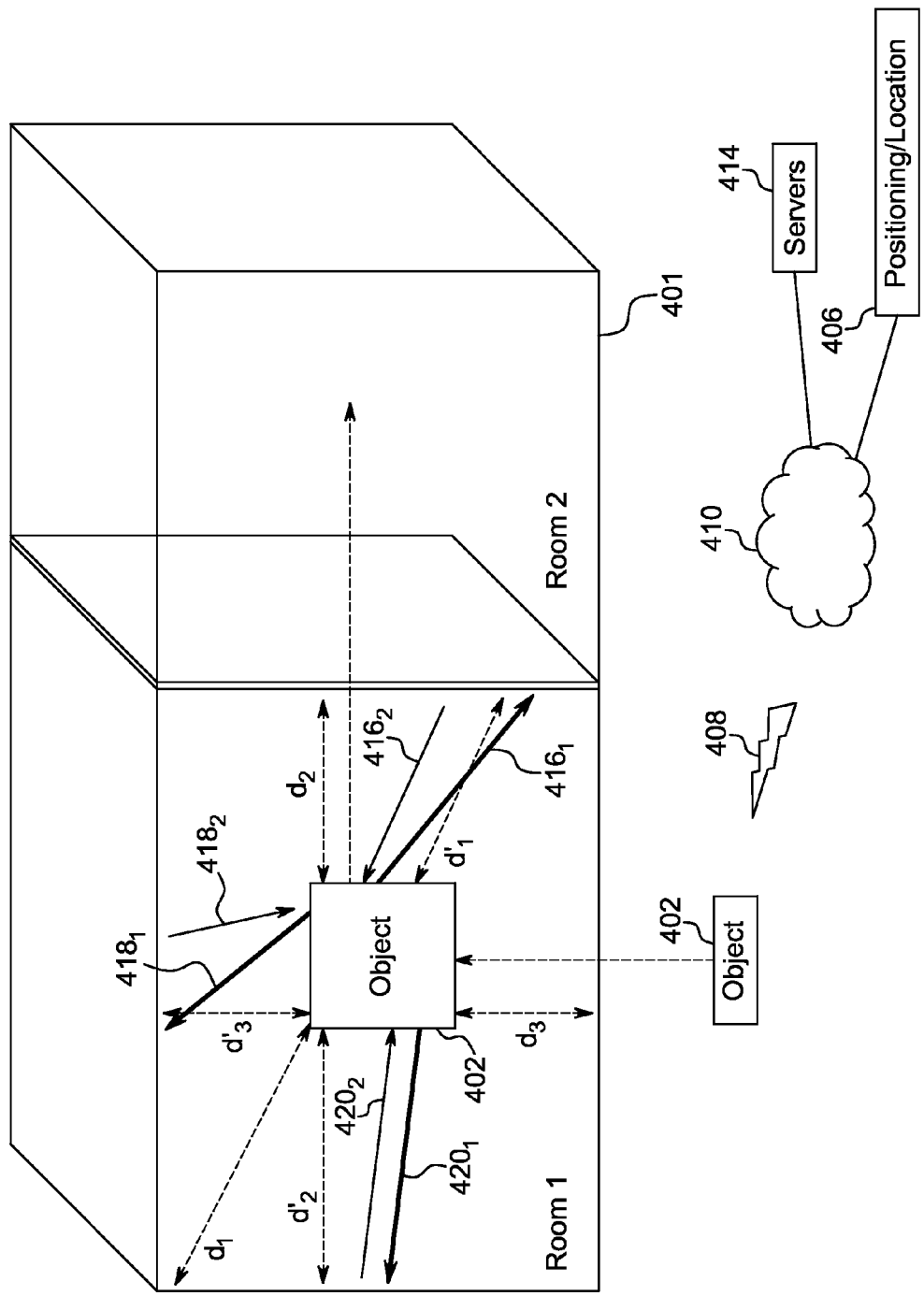
FIG. 4 is a diagram of detecting, locating, positioning, or tracking an object device indoors or in a conveyance using emitted or transmitted signals.

FIG. 4 is a diagram of detecting, locating, positioning, or tracking an object device indoors or in a conveyance using emitted or transmitted signals. Object device 402, which may be configured with at least some of the circuitry described in FIG. 1, may initially be outside or exterior to building 401. Object device 402 may determine its outdoor location or position by communicating over link 408 and network 410 with positioning or location device 406. Network 410 may include both wireless and wired networks. Outdoor location or position may be determined using a Global Navigation Satellite System (GNSS), Galileo, GPS, assisted GPS (A-GPS), cell identification (CELL ID), cellular base station based, delay for reflection, delay of arrival, time of arrival (TOA), triangulation, forward link triangulation (AFLT), trilateration, multilateration, time difference of arrival (TDOA), enhanced observed time difference (E-OTD), uplink TDOA (U-TDOA), time of flight calculations or estimations, Wi-Fi based, or the like. Any of the examples of outdoor location or position determination may determine an object device's coordinates, such as longitudinal or latitudinal values.

Once the outdoor location or position of object device 402 is determined, information about buildings in the vicinity, such as on the same block or neighborhood, of object device 402 may be retrieved from storage device 110. If information about buildings in the vicinity of object device 402 is not stored in storage device 110, object device 402 may communicate over network 410 to retrieve information about the buildings in the vicinity of object device 402 from at least one or more servers 414. At least one or more servers 414 may be collocated or distributed over multiple locations in a computer network, such as the Internet.

Information about building 401 may include the number floors, the number of rooms, architectural plans, architectural schematics, 3D (e.g. width, length, height) room dimensions, 3D estimated room dimensions, 2D (e.g. width, length) room dimensions, 2D estimated room dimensions, room volumes, space volumes, room areas, space areas, simple room layouts (e.g., width and length), room geometry, floorplans, building models, site plans, site surveys, or the like. Building 401 may be an abode, apartment, house, mall, warehouse, commercial building, office, cabin, condo, condominium, domicile, dormitory, dwelling, hospital, house, residence, shelter, enclosure, or the like.

One such building in the vicinity of object device 402 may be building 401 having rooms 1 and 2. Having information about building 401, object device 402 enters room 1 and emits or transmits at least signals $416_1$, $418_1$, or $420_1$. Signals $416_1$, $418_1$, or $420_1$ may be one of a combination of ultrasound, ultrasonic, non-audible to humans sound, near visible light, infrared, bluetooth, Wi-Fi, 802.11x, radio frequency, especially low frequencies, or the like that may provide accuracy of a few inches to a few feet. Near visible light may be emitted or transmitted by object device 402 using a near visible light transceiver. Object device 402 may adaptively change the signal type of signals $416_1$, $418_1$, or $420_1$ depending on the radio or acoustic characteristics of rooms 1 or 2.

Signals $416_1$, $418_1$, or $420_1$ may be configured to avoid noise and interference from other devices. This may be achieved by using spread spectrum. Moreover, signals $416_1$, $418_1$, or $420_1$ are different and uncorrelated enough such that object device 402 may separate reflection signals of $416_1$, $418_1$, or $420_1$. Signals $416_1$, $418_1$, or $420_1$ may be transmitted omnidirectionally or directionally, as desired.

In the case for ultrasound or an acoustic signal, object device 402 may include a speaker and microphone configured to accurately detect the reflection of transmitted signals, such as ultrasound. This may be advantageous since most current devices include a speaker and microphone and may simply need a software upgrade or an application to be able to detect reflections off walls for transmitted signals to determine or estimate at least one of distances or lengths $d_1$, $d'_1$, $d_2$, $d'_2$, $d_3$, or $d'_3$.

In order to determine or estimate at least one of distances or lengths $d_1$, $d'_1$, $d_2$, $d'_2$, $d_3$, or $d'_3$, object device 402 may determine the time it takes for reflection signals $416_2$, $418_2$, or $420_2$ to bounce off one or more walls, ceilings, floors, or objects in room 1 and be detected by object device 402. Reflection signals $416_2$, $418_2$, or $420_2$ correspond to signals $416_1$, $418_1$, or $420_1$, respectively, and may be detected using a correlation or matching algorithm. If enough distances or lengths are determined volume may be determined for room 1. Object device 402 may have to repeat emitting or transmitting signals $416_1$, $418_1$, or $420_1$ until at least one of distances or lengths $d_1$, $d'_1$, $d_2$, $d'_2$, $d_3$, or $d'_3$ is determined.

Object device 402 may determine the location of windows in room 1 if one of reflection signals $416_2$, $418_2$, or $420_2$ is received but the others are not or are very weak. Object device 402 may then transmit another signal in the direction where the reflection signal was not received or is very weak to see if the results are similar. By repeating this process, the location of windows and/or their dimensions may be determined. This can be combined with estimated or calculated room dimension information to identify a room in building 401 and thus object 402's room location in building 401.

When determining time of flight, object device may differentiate between multipath, undesired echoes, or Doppler shifts of reflections signals $416_2$, $418_2$, or $420_2$ by searching for the strongest reflections and dampening the weak reflections. Moreover, prior to transmitting signals $416_1$, $418_1$, or $420_1$ object device 402 may use a special beacon to identify or model radio characteristics of the room and measure temperature and air pressure, which especially affect ultrasound transmissions.

At least two of distances or lengths $d_1$, $d'_1$, $d_2$, $d'_2$, $d_3$, or $d'_3$ may be used to compare to building information to determine or identify that object device 402 is inside/indoors and/or in room 1. For instance, room 1 may have special dimensions unique from room 2. Dimensions may include width, length, height, depth, etc. In addition to dimensions, room 1 may have certain area, volume, or layout characteristics that can be used to determine that object device 402 is in fact in room 1. If an exact match is not found, object device 402 may determine and display on one or more display devices 122 the closest match.

If no reasonable match is found after a first try or the dimensions do not make sense, signals $416_1$, $418_1$, or $420_1$ may be emitted or transmitted to sweep, size, or trace room 1 again. If no reasonable match is found, object device 402 or a networked server may calculate or estimate a probability that it is in a certain room in building 401 and display it on one or more display devices 122. It may then increase the probability by using prior location information, location information from a network, or stored building information to increase the probability of room location.

Once a room location within building 401 is determined, or even if the search did not find any matches, object device 402 may use at least two of distances or lengths $d_1$, $d'_1$, $d_2$, $d'_2$, $d_3$, or $d'_3$ to determine where it is located within room 1 and subsequently track its motion within room 1. In another embodiment, object device 402 may generate a custom map on the fly or dynamically of the interior of building 401 as it moves from room to room using distances or lengths $d_1$, $d'_1$, $d_2$, $d'_2$, $d_3$, or $d'_3$ for each room, hallway, etc. This information may be stored in storage device 110 for future use.

Knowing the room location or position of object device 402 in building 401 and/or its location or position in room 1, object device 402 may be tracked remotely by a server, on the Internet by a user, or by another device on the Internet. Tracking by another user provides numerous possibilities for social networking, gaming, workforce management, etc.

In another embodiment, object device 402 may already know its outdoor location, have building information for building 401, and be located in building 401. Object device 402 may then locate and track itself indoors using any of the embodiments given above.

In another embodiment, object device 402 may detect that it's in a conveyance, such as an automobile, airplane, bus, train, etc. . . . Object 402 determines that it's in a conveyance based on calculated or estimated distances or lengths $d_1$, $d'_1$, $d_2$, $d'_2$, $d_3$, or $d'_3$. When object device 402 detects that it is in a conveyance it can prepare navigation and other useful applications for a user in anticipation. In addition, determining when object device 402 is in a conveyance may be helpful for emergency services.

In another embodiment, object device 402 may find other object devices nearby by detecting signals from other object devices and determine the distance to the other object devices, such as by using ultrasound signals.

Assistant data may be used by object device 402 in the case that too many matches of rooms are made, such as when building 401 has many rooms of similar layout. For instance, object device 402 may use recent outdoor location information, such as by GNSS or GPS, such as to estimate what side of the building it is located to further narrow its location within building 401 and reduce the possible location positions when comparing it to building layout or model information. The last known altitude reading of object device 402 may also assist it in determining what floor in building 401 it is on. Object device's 402 speed and bearing from outdoor location services may also be provided as assistance data for tracking indoors. Moreover, if an exact room location cannot be determined, object device 402 may calculate, provide, and/or display on one or more display devices 122 a probability that it's in a certain room.

Object device 402 may also use a specialized GNSS or GPS high sensitive receiver configured to receive outdoor GNSS or GPS signals indoors as assistance information for determining its room location or location within a room in building 401. Moreover, building 401 may have a GNSS or GPS repeater that repeats received outdoor GNSS or GPS signals indoors. This may also be used by object device 402 as assistance information to determine its room location or location within a room in building 401.

Another example of assistance data is using a camera on object device 402 to identify objects or characteristics unique to room 1 or 2. Identified objects or characteristics unique to room 1 or 2 are compared to stored objects previously identified for room 1 or 2 in a database in storage device 110 or at least one or more servers 414. Object device 402 may wirelessly communicate with at least one or more servers 414 to access the database.

Another example of assistance data may be having an RFID reader in object device 402 to read RFID tags near elevator doors on every floor of building 401 to identify the floor object device 402 gets on or off. An elevator may also have a beacon or transmitter that identifies each floor by transmitting a signal that can be detected by object device 402. In addition, a floor identification device may also use Wi-Fi, Bluetooth, a femtocell, or a picocell on the elevator to communicate floor information to object device 402.

Moreover, when inside a building object device 402 may determine what floor it is on by detecting or determining that it is on an elevator and by measuring the time spent riding the elevator. Object device 402 may determine that it is in an elevator by noticing that the dimensions of the space are similar to an elevator.

If object device 402 determines with low probability what it is in, it may use prior location information, location information from a network, or stored building information to increase its probability.

Another example of assistance data is using a laser transceiver or other light sensitive devices to determine the distance or range to any walls or ceiling. This may be used sparingly or for initial calibration in order to not bother the user or other people in the building 401.

An accelerometer, gyroscope, or e-compass in object device 402 may be used for determining orientation before performing any measurements to determine distances, lengths, or position within room 1. Orientation may be used to determine if object device 402 is upright or upside down and the direction the user is facing within room 1. Orientation may be useful in position or location calculations since it can be used to determine if one of calculated dimensions $d_1$, $d'_1$, $d_2$, $d'_2$, $d_3$, or $d'_3$ corresponds to the height, length, or width of room 1 or 2.

Once an initial position and room location is determined for object device 402, an accelerometer, gyroscope, or e-compass in object device 402 may also be used to estimate inertia or motion in order to estimate its next location. This data may be used when moving from room 1 to 2 as assistance data. Inertial data may also be used for faster calculations. For instance, if object device 402 is moving in a certain direction $d_1$ and $d'_1$ may have values moving in opposite directions, i.e. one increases while the other decreases. Using direction detection, object device 202 will know which value should be increasing or decreasing.

Moreover, object device 402 may be able to detect its speed and direction of motion within room 1 by determining how quickly it is approaching a certain wall, floor, or ceiling based on when reflection signals $416_2$, $418_2$, or $420_2$ are received by object device 402. Object device 402 may also determine its speed and direction of motion within room 1 based on the rate of change of at least one of values $d_1$, $d'_1$, $d_2$, $d'_2$, $d_3$, or $d'_3$. This may help in determining or expecting the next location or position of object device 402.

Object device 402 may also emit signals $416_1$, $418_1$, or $420_1$ to detect motion of another object. For instance signals $416_1$, $418_1$, or $420_1$ may be ultrasonic or acoustic transmissions accurate to less than a foot that detect the motion of a victim in a burning building by a fireman. Signals $416_1$, $418_1$, or $420_1$ may also be infrared transmitted by a mobile telephone, which is particularly useful since many phones currently have infrared sensors and may require only a software upgrade or application download to use the infrared sensor as a motion detection device.

In the indoor positioning systems (IPS) or indoor location services (iLS) provided herein, object device 202 or 402 may also determine whether it's outside. For example, object device 202 may know that it is outside by not detecting at least one of signals $220_1$, $220_2$, $220_3$, $224_1$, $224_2$, or $224_3$. Object device 402 may know that it is outside by not detecting any strong reflection signals $416_2$, $418_2$, or $420_2$. Detecting that object device 202 or 402 is outside can be combined with outdoor location, such as GNSS or cell network based outdoor positioning, for a more exact outdoor location or position.

Moreover, determining when object device 202 or 402 exits a particular building can be combined with outdoor location, such as determined by GNSS, GPS, or cell network based outdoor positioning, for a more exact outdoor position or location. Outdoor positioning in combination with indoor positioning may be helpful in providing door-to-door turn-by-turn directions for a user of object device 202 or 402. For instance, object device 202 or 402 helps direct a user outside the building using the indoor positioning system then provide driving directions for the user to get home using the outdoor positing system or vice-versa.

When determining indoor or outdoor positioning, object device 202 or 402 may handle all the calculations of measurements or location determination, provide measurements to a networked computer for calculations or location determination, or a combination of both. Reducing the calculation load or processing on object device 202 or 402 may reduce battery consumption and increase accuracy and speed by leveraging greater processing power of a networked computer.

Object device 202 or 402, which may be combined, may use its determined location or position for context awareness computing, gaming, mobile marketing, 3D maps, 2D maps, social networking, business networking, text messaging, email, context awareness applications, augmented reality gaming, a real life first person shooting game, locating a lost phone online, fantasy gaming, virtual world gaming such as Secondlife™, room light and mood controls, real life interactive board games, children games, role playing games, hide and seek game for children, finding missing objects, determine when object device 202 or 402 is missing from a room, elderly people tracking, children monitoring and tracking in a house, employee tracking, law enforcement, mobile applications, walking directions, friend finders, security alerts, geocaching, geo-tagging, travel recommendations, indoor sports, tracking, monitoring, mobile commerce, military combat, or the like.

In the case of needed emergency care, object device 202 or 402 may be activated remotely by 911 personal or any other user with security permissions in order to determine its position or location indoors or to determine that it is outdoors. Moreover, a fire fighter with object device 202 or 402 may be able to navigate through a smoke filled or dark building and find other object devices. Similarly, an object device 202 or 402 with voice turn-by-turn directions may assist a blind person with navigating through a building.

Object device 202 or 402 may send or receive a text or multimedia message dependent on its room location. This may be useful for mobile advertising, just in time notifications, or the like.

For augmented reality gaming, a first user may use object device 402 as a virtual weapon to combat a second user having another object device 402 as a virtual weapon. As the first user walks in a building they may see a virtual augmented world on one or more display devices 122 in object device 402. Virtual objects may be placed, superimposed, or transposed on the foreground or background of the inside or outside of the building displayed on one or more display devices 122, or remotely, using one or more cameras on object device 402. The room location and indoor tracking is used to provide the first and second users directions to each other for combat. Once they find each other, object devices may be superimposed with graphics to look like virtual weapons when viewed through one or more display devices 122 using one or more cameras on object device 402. Alternatively, the indoor location and tracking may be used to guide users to virtual treasures in a building. Object device 202 or 402 and any of the features herein may be integrated into eye glasses or sun glasses.

As an example of context awareness, object device 202 or 402's most common visits or time in a room may be used to provide extra heating or cooling or trigger another context driven reaction. Moreover, a user of object device 202 or 402 may avoid a room that is occupied when viewing the location of other object devices in a building on one or more display devices 122. In addition, object device 202 or 402 may show the room locations of other users having object devices in a contact list or address book especially if they are nearby.

Still referring to context awareness, after identifying a room object device 202 or 402 may display or run applications used in that room or even a position in the room. For instance, object device 202 or 402 may display or run a news application when the user is in bed if it is an application commonly used in bed. Usage information of applications 202 or 402 may be stored in storage device 110.

Figure 5:
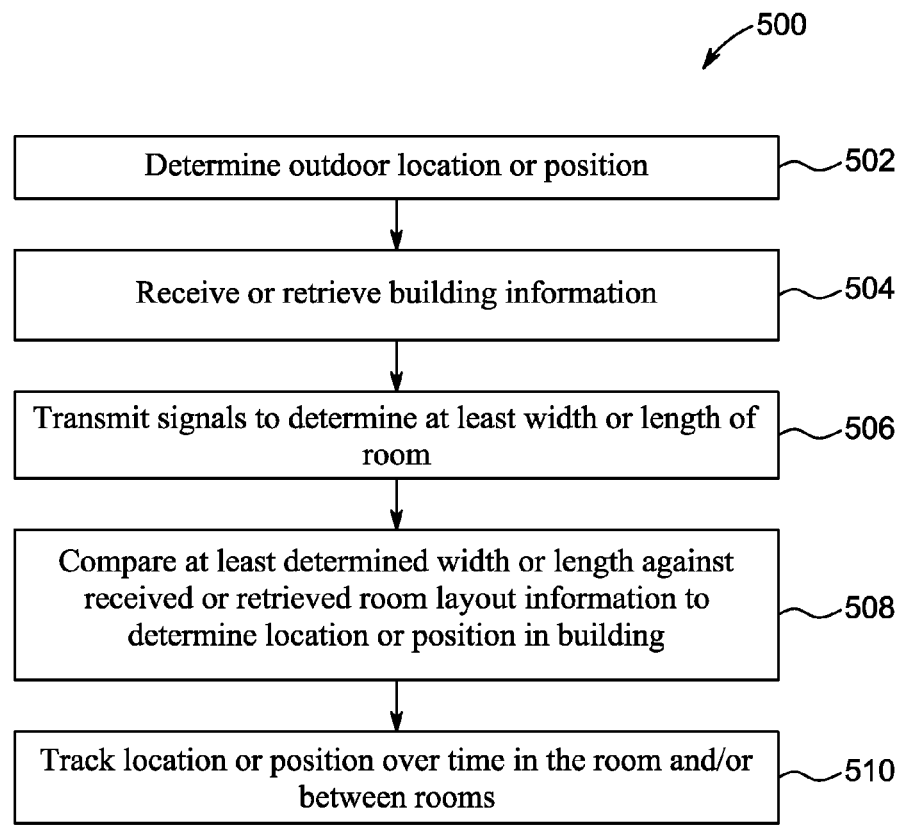
FIG. 5 is a process for detecting, locating, positioning, or tracking an object device indoors using emitted or transmitted signals.

FIG. 5 is a process 500 for detecting, locating, positioning, or tracking an object device indoors using emitted or transmitted signals. In process 500, an outdoor location is determined for or by an object device (502). The object device may be located indoors when acquiring its outdoor location. Based on in part the outdoor location, the object device receives over a network or retrieves from its storage device building information for at least one nearby building (504). Examples of building information are provided above. Object device transmits signals to determine at least the width or length of the room it is located in (506). Types of signals that may be emitted or transmitted are provided above.

The object device or a server on a network compares at least determined width or length against received or retrieved room layout information in the building information to determine location or position in the building (508). Object device can then have its position of location tracked over time in the room and/or between rooms (510). A database of rooms and layouts may be built in the object device or a server in the network as dimensions are estimated.

Although features and elements are described above in particular combinations, each feature or element can be used alone without the other features and elements or in various combinations with or without other features and elements. The methods, processes, or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, digital versatile disks (DVDs), and BluRay discs.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement hardware functions for use in a computer, wireless transmit receive unit (WTRU) or any host computer. The programmed hardware functions may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A mobile computer comprising:
   at least one sensor configured to measure a distance between the mobile computer and a part of a vehicle or conveyance; and
   a processor configured to determine whether the mobile computer is located in the vehicle or conveyance based on the measured distance.

2. The mobile computer of claim 1, wherein the processor is further configured to analyze gyroscope related data to determine an orientation of the mobile computer.

3. A method for operating a mobile computer, the method comprising:
   measuring, by at least one sensor of the mobile computer, a distance between the mobile computer and a part of a vehicle or conveyance; and
   determining, by a processor of the mobile computer, whether the mobile computer is located in the vehicle or conveyance based on the measured distance.

4. The method of claim 3, further comprising:
   analyzing, by the processor, gyroscope related data to determine an orientation of the mobile computer.

5. The mobile computer of claim 1, wherein the processor is further configured to prepare an application based on the determination.

6. The mobile computer of claim 1, further comprising:
   a transceiver configured to receive a notification related to an advertisement based on the determination.

7. The mobile computer of claim 1, wherein the processor is further configured to determine whether the mobile computer is located in the vehicle or conveyance further based on satellite related positioning information.

8. The mobile computer of claim 1, further comprising:
   a display configured to receive a touch input,
   wherein the processor is further configured to determine whether the mobile computer is located in the vehicle or conveyance further based on the touch input.

9. The method of claim 3, further comprising preparing an application based on the determination.

10. The method of claim 3, further comprising receiving a notification related to an advertisement based on the determination.

11. The method of claim 3, wherein the determining of whether the mobile computer is located in the vehicle or conveyance is further based on satellite related positioning information.

12. The method of claim 3, further comprising:
    receiving a touch input,
    wherein the determining of whether the mobile computer is located in the vehicle or conveyance is further based on the touch input.

* * * * *